(12) United States Patent
Chen et al.

(10) Patent No.: US 11,866,262 B2
(45) Date of Patent: Jan. 9, 2024

(54) AUTOMATIC TRAY FEEDING DEVICE, TRAY SORTING TABLE INCLUDING AND SECURITY INSPECTION SYSTEM INCLUDING THE DEVICE

(71) Applicants: Nuctech Company Limited, Beijing (CN); Tsinghua University, Beijing (CN)

(72) Inventors: Zhiqiang Chen, Beijing (CN); Li Zhang, Beijing (CN); Jinning Liang, Beijing (CN); Qingping Huang, Beijing (CN); Mingzhi Hong, Beijing (CN); Yanhua Lu, Beijing (CN); Bo Li, Beijing (CN); Yue Li, Beijing (CN); Majie Weng, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 73 days.

(21) Appl. No.: 17/511,874

(22) Filed: Oct. 27, 2021

(65) Prior Publication Data
US 2022/0127080 A1    Apr. 28, 2022

(30) Foreign Application Priority Data
Oct. 28, 2020    (CN) .......................... 202011175693.X

(51) Int. Cl.
*B65G 13/07*    (2006.01)
*B65G 47/57*    (2006.01)

(52) U.S. Cl.
CPC ............. *B65G 13/07* (2013.01); *B65G 47/57* (2013.01); *B65G 2201/0258* (2013.01); *B65G 2203/0233* (2013.01); *B65G 2203/044* (2013.01)

(58) Field of Classification Search
None
See application file for complete search history.

(56) References Cited

U.S. PATENT DOCUMENTS

| 9,751,701 B2 * | 9/2017 | Fritzsche | B65G 37/00 |
| 10,773,906 B1 * | 9/2020 | Mohammed | B65G 59/10 |

FOREIGN PATENT DOCUMENTS

| CN | 202051187 A | 11/2011 |
| CN | 203021036 U | 6/2013 |
| CN | 204236894 U | 4/2015 |
| CN | 105460485 A | 4/2016 |
| CN | 207046458 U | 2/2018 |
| CN | 207051218 U | 2/2018 |
| CN | 209023582 U | 6/2019 |

(Continued)

OTHER PUBLICATIONS

First Chinese Office Action 202011175693 dated Aug. 23, 2022.

(Continued)

*Primary Examiner* — Kavel Singh
(74) *Attorney, Agent, or Firm* — Merchant & Gould P.C.

(57) ABSTRACT

An automatically tray feeding device includes: at least one conveying mechanism configured to convey a tray at different heights; at least one lifting mechanism configured to move the tray on a conveying mechanism at a first height to a conveying mechanism at a second height different from the first height; and a sorting table frame configured to carry the at least one conveying mechanism and the at least one lifting mechanism.

14 Claims, 9 Drawing Sheets

(56) References Cited

FOREIGN PATENT DOCUMENTS

| | | |
|---|---|---|
| CN | 110449377 A | 11/2019 |
| CN | 110902262 A | 3/2020 |
| CN | 211418617 U | 9/2020 |
| DE | 102010026940 A | 1/2012 |
| JP | 2004168440 A | 6/2004 |

OTHER PUBLICATIONS

PCT International Search Report for PCT Application No. PCT/CN2021/120996 dated Dec. 3, 2021 (6 pages, with English translation).

PCT Written Opinion for PCT Application No. PCT/CN2021/120996 dated Dec. 3, 2021 (3 pages).

* cited by examiner

AUTOMATIC TRAY FEEDING DEVICE, TRAY SORTING TABLE INCLUDING AND SECURITY INSPECTION SYSTEM INCLUDING THE DEVICE

CROSS-REFERENCE TO RELATED APPLICATION

This application claims priority to Chinese Patent Application No. 202011175693.X, filed Oct. 28, 2020, the entire content of which is incorporated herein by reference.

TECHNICAL FIELD

The present disclosure relates to a field of a baggage security inspection, and in particular to an automatic tray feeding device, a tray sorting table including the automatic tray feeding device and a security inspection system including the automatic tray feeding device.

BACKGROUND

A background description provided here is to present a background of the present disclosure as a whole. To an extent described in the background section, a work of currently signed inventors and various aspects that may not constitute a description of a related art at the time of submission are neither expressly nor impliedly considered as the related art for the present disclosure.

Before a passenger enters an airport or a station, a security inspection needs to be performed on a hand luggage of the passenger. A general practice is that the passenger or a security inspector takes an empty tray from a bottom of a sorting table in front of a security inspection machine and places the tray on the sorting table, then puts the hand luggage and a carry-on item on the tray. After the tray passes through the security inspection system, the security inspector may determine whether the baggage is dangerous or not by using the security inspection machine (e.g., an X-ray inspection machine), to distinguish a suspect baggage from a safe baggage through the security inspection system. The safe baggage may be taken away by the passenger, whereas the suspect baggage may be placed at an unpacking place and the passenger is guided to unpack the suspect baggage for inspection.

SUMMARY

In one aspect, an automatically tray feeding device is provided. The automatically tray feeding device includes: at least one conveying mechanism configured to convey a tray at different heights; at least one lifting mechanism configured to move the tray on a conveying mechanism at a first height to a conveying mechanism at a second height different from the first height; and a sorting table frame configured to carry the at least one conveying mechanism and the at least one lifting mechanism.

In some embodiments, the automatically tray feeding device further includes at least one retractable pallet mechanism mounted on a top of the sorting table frame, wherein the at least one lifting mechanism is configured to lift the tray on the conveying mechanism located at the first height or the tray on the conveying mechanism located at the second height to the top of the sorting table frame when the retractable pallet mechanism is retracted.

In some embodiments, the lifting mechanism includes a drive motor, a straight rail, a synchronous belt, a pallet and at least one limit member, wherein the pallet is configured to be moved up and down through the straight rail and the synchronous belt, and a range of a movement of the pallet is restricted by the at least one limit member.

In some embodiments, the pallet is foldable or is rotatable by 90 degrees about a side of the pallet.

In some embodiments, the retractable pallet mechanism includes a pair of rails, at least one pulley slidable in the pair of rails, and at least one flexible plate, wherein the at least one pulley is mounted on the at least one flexible plate.

In some embodiments, the pair of rails face each other and are each formed in a shape of "Π", and each of the at least one flexible plate is bendable by 90 degrees.

In some embodiments, the at least one conveying mechanism includes at least one electric roller, a plurality of driven rollers and at least one transmission belt. The at least one electric roller is configured to drive the plurality of driven rollers to move through the at least one transmission belt.

In some embodiments, the automatically tray feeding device further includes at least one photoelectric detection device mounted on the sorting table frame to sense a position of the tray.

In some embodiments, the automatically tray feeding device further includes a conveying mechanism and a tray translation mechanism located at the same height, wherein the tray translation mechanism is mounted on the conveying mechanism located at the same height.

In some embodiments, the tray translation mechanism includes a synchronous pulley, a transmission roller and a shifting member, wherein the transmission roller is configured to drive the synchronous pulley to rotate, and the shifting member is located on the synchronous belt to push the tray to move.

In some embodiments, the synchronous pulley is located between the electric roller and a driven roller adjacent thereto.

In some embodiments, the tray translation mechanism includes a roller conveying mechanism, a raising mechanism and a moving mechanism, wherein the raising mechanism includes a cam configured to raise the moving mechanism, so that the tray leaves the roller conveying mechanism and is moved laterally by the moving mechanism.

In some embodiments, the moving mechanism is located between the electric roller and a driven roller adjacent thereto.

In another aspect, a tray sorting table is provided, including the automatically tray feeding device in any embodiment above.

In yet another aspect, a baggage security inspection system is provided, including the automatically tray feeding device in any embodiment above.

BRIEF DESCRIPTION OF THE DRAWINGS

The present disclosure will be more fully understood from the detailed description and drawings. The drawings are shown to illustrate one or more embodiments of the present disclosure, and are used together with the description to explain the principle of the present disclosure. Where possible, the same reference numerals are used in all the drawings to represent the same or similar elements of the embodiments.

DETAILED DESCRIPTION OF EMBODIMENTS

Figure 1:
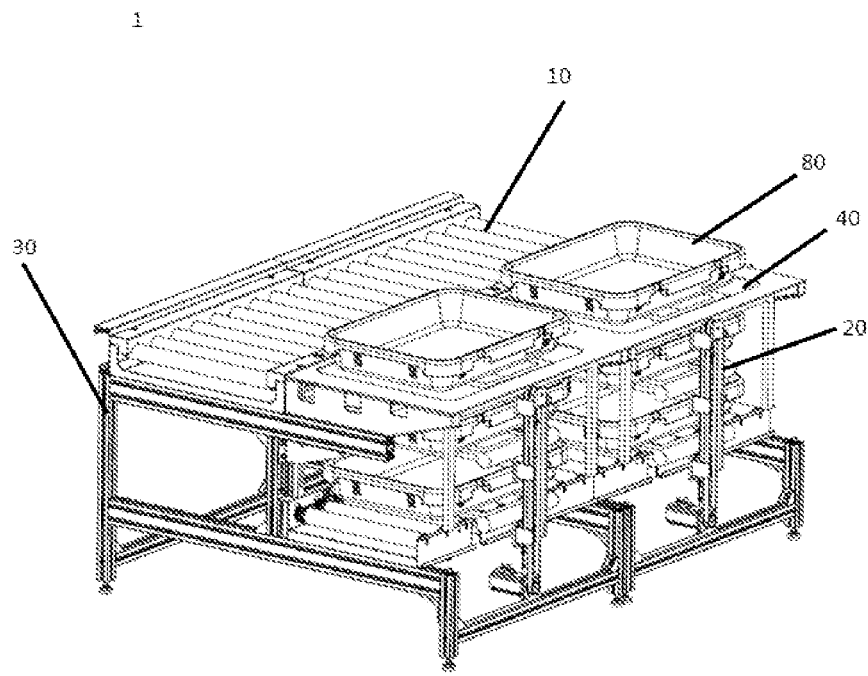
FIG. 1 is a schematic perspective view of an automatically tray feeding device according to some exemplary embodiments of the present disclosure.

Hereinafter, the technical solutions of the present disclosure will be described more fully and clearly with reference to the drawings of the embodiments of the present disclosure. However, the described embodiments are only part of the embodiments of the present disclosure, rather than all the embodiments. Based on the embodiments of the present disclosure, all other embodiments obtained by those of ordinary skill in the art without creative work shall fall within the protection scope of the present disclosure.

In addition, in the following detailed description, for ease of introduction, multiple specific details are set forth to provide a comprehensive understanding to the embodiments of the present disclosure. However, one or more embodiments may also be implemented without these specific details. In other cases, well-known structures and devices are shown in the form of illustration to simplify the drawings.

Hereinafter, the present disclosure will be described more fully with reference to the drawings, in which exemplary embodiments of the present disclosure are shown. However, the present disclosure may be implemented in different embodiments, and should not be construed as being limited to the embodiments described herein. The embodiments provided in the present disclosure are intended to make the present disclosure more thorough and complete, and to fully convey the scope of the present disclosure to those skilled in the art. In the drawings, a thickness and an area of a layer may be enlarged for clarity. Throughout the specification, the same reference numerals are used to represent the same elements. For different implementations, the elements may have different interrelationships and different positions.

In actual use, since most passengers may use an automatic baggage security inspection system for the first time, they may not be able to find a tray at the bottom of a sorting table immediately, and a security inspector needs to guide frequently or handle the tray manually. In addition, the tray is located at the bottom of the sorting table, and thus the passenger or the security inspector needs to bend over to take out the tray, which is inconvenient.

An embodiment of the present disclosure provides a new automatically tray feeding device, which may be used in an automatic hand-luggage security inspection system in various occasions, such as airports, stations, and various places in which a security inspection needs to be performed.

FIG. 1 is a schematic perspective view of an automatically tray feeding device according to some exemplary embodiments of the present disclosure. As shown in FIG. 1, an automatically tray feeding device 1 includes: at least one conveying mechanism 10, at least one lifting mechanism 20 and a sorting table frame 30. For example, the at least one conveying mechanism 10 may include two conveying mechanisms 10 at different heights. The at least one conveying mechanism 10 is used to convey a tray 80 at different heights; the at least one lifting mechanism 20 is used to move the tray 80 on a conveying mechanism 10 at a first height to a conveying mechanism 10 at a second height different from the first height; and the sorting table frame 30 is used to carry the at least one conveying mechanism 10 and the at least one lifting mechanism 20.

Specifically, the automatically tray feeding device 1 may include a sorting table frame 30 or may be mounted on the sorting table frame 30. A security inspector may check a luggage item of a passenger on a sorting table 90, which may also be mounted on the sorting table frame 30. Components related to the automatically tray feeding device 1, such as the conveying mechanism 10 and the lifting mechanism 20, may also be mounted on the sorting table frame 30. The sorting table frame 30 may be further provided with a security inspection mechanism, so that the entire security inspection system is integrated. The sorting table frame 30 may be constructed by aluminum profile and stainless steel metal sheet. The at least one conveying mechanism 10 may include conveying mechanisms located at two different heights, such as an upper conveying mechanism and a lower conveying mechanism. The upper conveying mechanism may be flush with a top of the sorting table frame 30 or slightly lower than the top of the sorting table frame 30. The lifting mechanism 20 may transport an empty tray in a lower position to the top of the sorting table frame 30, for the passenger to place the carry-on luggage item. In this way, the automatically tray feeding device may be implemented to automatically transport an empty tray at the bottom of the sorting table. Since the empty tray may be transported to a top surface of the sorting table by the lifting mechanism of the automatically tray feeding device, the passenger may directly put a luggage into the tray on the sorting table without looking for the tray, which is conducive to security inspection.

In another embodiment of the present disclosure, the automatically tray feeding device 1 may further include at least one retractable pallet mechanism 40 mounted on the top of the sorting table frame 30. The lifting mechanism 20 may lift the tray 80 on the conveying mechanism 10 located at the first height or the conveying mechanism 10 located at the second height to the top of the sorting table frame 30 when the retractable pallet mechanism 40 is retracted. For example, the retractable pallet mechanism 40 may be provided on the top of the sorting table frame 30, so that the lifting mechanism 20 may transport the empty tray on the lower conveying mechanism to the top of the sorting table frame 30. As shown, the retractable pallet mechanism is mounted on the top of the sorting table 90. When the retractable pallet mechanism is retracted (opened), an opening may be formed. The empty tray on the lifting mechanism 20 may pass through the opening and come to the top of the sorting table frame 30, so that the passenger may place the carry-on item into the tray. After that, the passenger may push the tray with the carry-on item into the upper conveying mechanism, so that the security inspection may be performed automatically.

Figure 2:
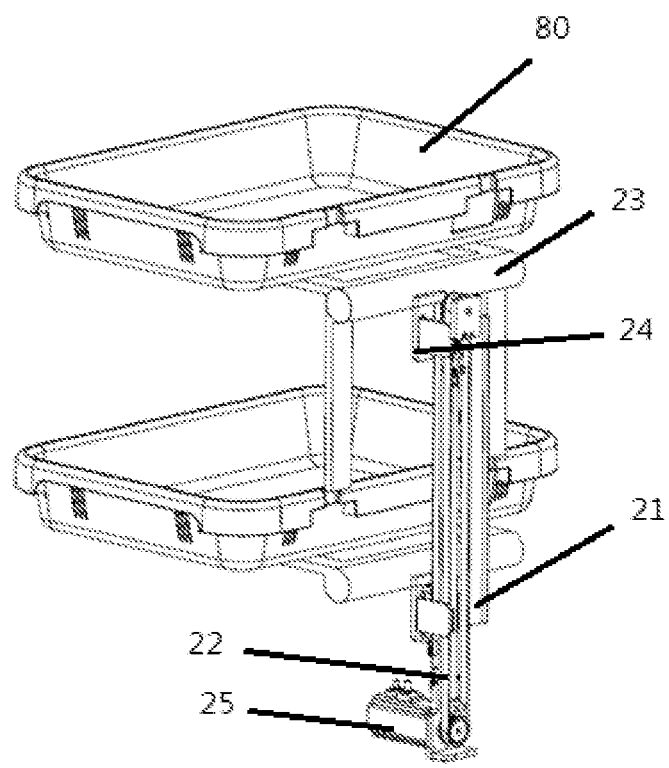
FIG. 2 is a schematic perspective view of a lifting mechanism according to some exemplary embodiments of the present disclosure.
Figure 3:
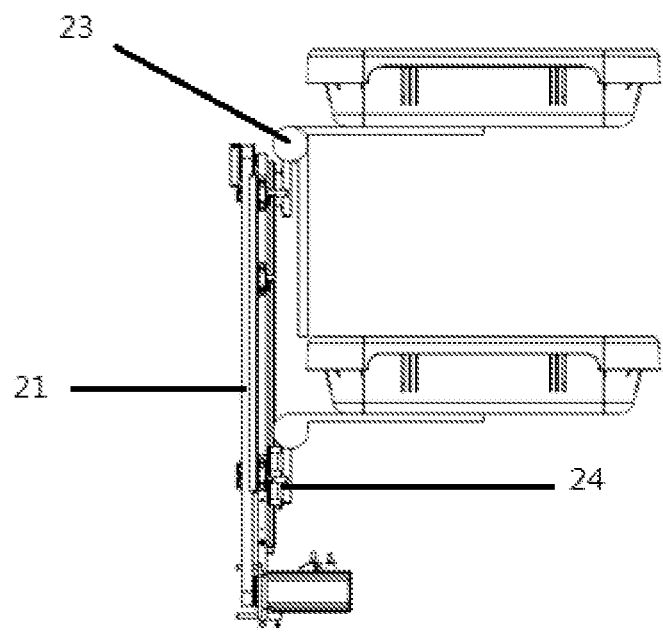
FIG. 3 is a side view of a lifting mechanism according to some exemplary embodiments of the present disclosure.

FIG. 2 is a schematic perspective view of a lifting mechanism according to some exemplary embodiments of the present disclosure. FIG. 3 is a side view of a lifting mechanism according to some exemplary embodiments of the present disclosure. As shown in FIGS. 2 and 3, the lifting mechanism 20 includes a straight rail 21, a synchronous belt 22, a pallet 23 and at least one limit member 24. The pallet 23 may be moved up and down through the straight rail 21 and the synchronous belt 22, and a range of a movement of the pallet 23 is restricted by the at least one limit member 24.

Specifically, the synchronous belt 22 of the lifting mechanism 20 may be mounted on the straight rail 21, and the pallet 23 may be connected to the synchronous belt 22 through a connection member. A motor 25 may supply power to the synchronous belt 22, so that the pallet 23 may be moved up and down along the straight rail 21 under a drive of the motor 25. The straight rail 21 may be further provided with a plurality of limit members 24, for example, one limit member 24 may be provided at each of an upper end and a lower end of the straight rail 21. In this embodiment, a plurality of pallets 23 may be provided, so that more trays may be transported, for example, two pallets are shown in FIG. 2. In the case of the plurality of pallets 23, a distance between two pallets 23 is greater than or equal to a sum of a length of the pallet 23 and a height of the tray 80. The length of the pallet 23 is not limited in the present disclosure, as long as the pallet may stably carry the tray 80.

In this embodiment, the pallet 23 may be foldable, or may be rotatable by 90 degrees about a side (e.g., a side edge) of the pallet 23. As shown in FIGS. 2 and 3, when transporting the tray 80, the pallet 23 may be placed horizontally. When the tray 80 is removed, that is, after the pallet 23 reaches a highest position, the pallet 23 may be rotated into a vertical state. After being rotated, the pallet 23 starts to descend, and when reaching a lowest position, the folded pallet 23 is opened to hold up a new empty tray that is on the lower conveying mechanism 10. Alternatively, in another embodiment, the pallet 23 may be foldable and horizontally arranged. When the tray 80 needs to be placed onto the pallet 23, the pallet 23 may be unfolded from a folded state to a horizontally arranged state, and when the tray 80 is removed, the pallet 23 may return to the folded state. In the case where the pallets 23 are foldable, the distance between the pallets 23 may be shortened, so that more trays may be transported, which may further improve the operation efficiency.

Figure 4:
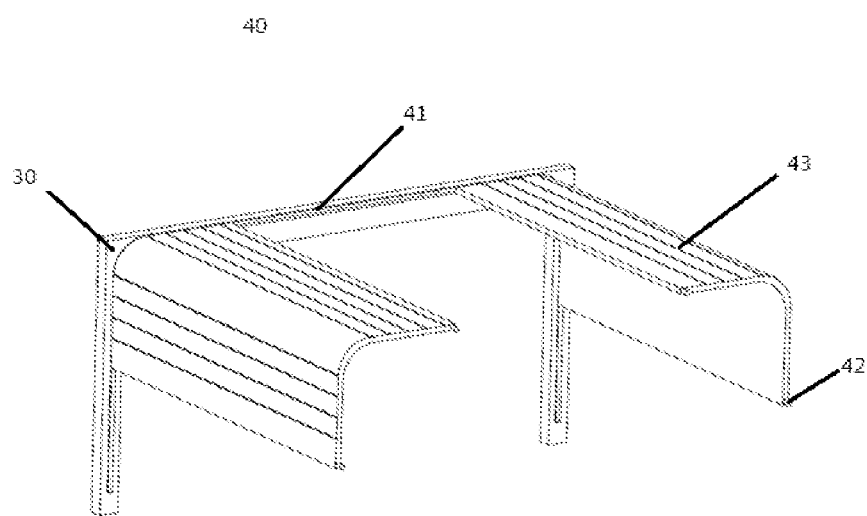
FIG. 4 is a schematic perspective view a retractable pallet mechanism according to some exemplary embodiments of the present disclosure.

FIG. 4 is a schematic perspective view of a retractable pallet mechanism according to some exemplary embodiments of the present disclosure. In this embodiment, one or more retractable pallet mechanisms 40 may be provided on the top of the sorting table frame 30. As shown in FIG. 4, the retractable pallet mechanism 40 may include a pair of rails 41, at least one pulley 42 and at least one flexible plate 43, where each flexible plate 43 is provided with pulleys 42 on both sides. As shown, each of two ends of a side surface of the flexible plate 43 is provided with a pulley 42, and the pulley 42 may move in the rail 41, so as to drive the flexible plate 43 to move, as such, the flexible plates 43 may be opened and closed (i.e., retracted and extended) with respect to each other. When the flexible plates 43 move away from each other (retract), the retractable pallet mechanism 40 is opened, and an opening is formed between the flexible plates 43, so that the tray 80 may be lifted onto the sorting table frame 30 through the opening. When the flexible plates 43 move towards each other (extend), the retractable pallet mechanism 40 is closed, and the opening between the flexible plates 43 does not exist.

In this embodiment, the pair of rails 41 are arranged facing each other in the sorting table frame 30, and the flexible plates 43 are between the pair of rails 41. The rails 41 may have a shape similar to "Π" when viewed from the front. Each flexible plate 43 may be bent approximately 90 degrees with cooperation of the rails 41 and the pulleys 42.

Figure 5:
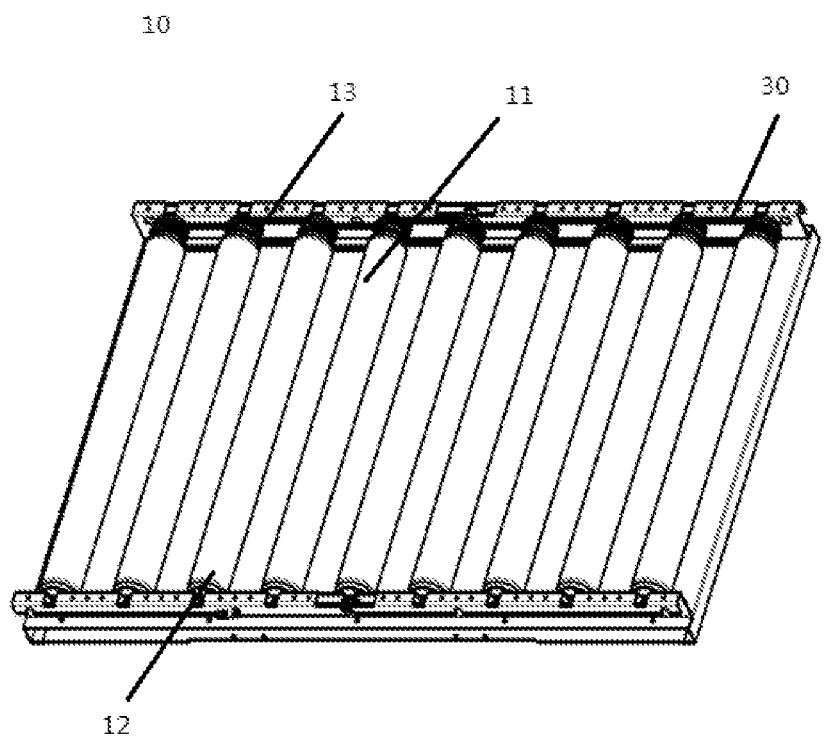
FIG. 5 is a partial schematic perspective view of a conveying mechanism according to some exemplary embodiments of the present disclosure.

FIG. 5 is a partial schematic perspective view of a conveying mechanism according to some exemplary embodiments of the present disclosure. As shown in FIG. 5, the conveying mechanism 10 may include an electric roller 11, a driven roller 12 and a transmission belt 13 that are mounted on the sorting table frame 30. The electric roller 11 and the driven roller 12 are connected through the transmission belt 13, and the electric roller 11 is driven by a motor (not shown), so that the driven roller 12 may achieve a rotational movement under the drive of the electric roller 11. The numbers of the electric roller 11 and the driven roller 12 are not limited in the present disclosure. In some embodiments, one electric roller 11 may drive seven driven rollers 12 through the transmission belt 13.

In some other embodiments, the conveying mechanism may be implemented by an existing conveying roller in an existing mechanism, or may be implemented by an existing conveying belt in the existing mechanism, which is not limited in the present disclosure.

Figure 6:
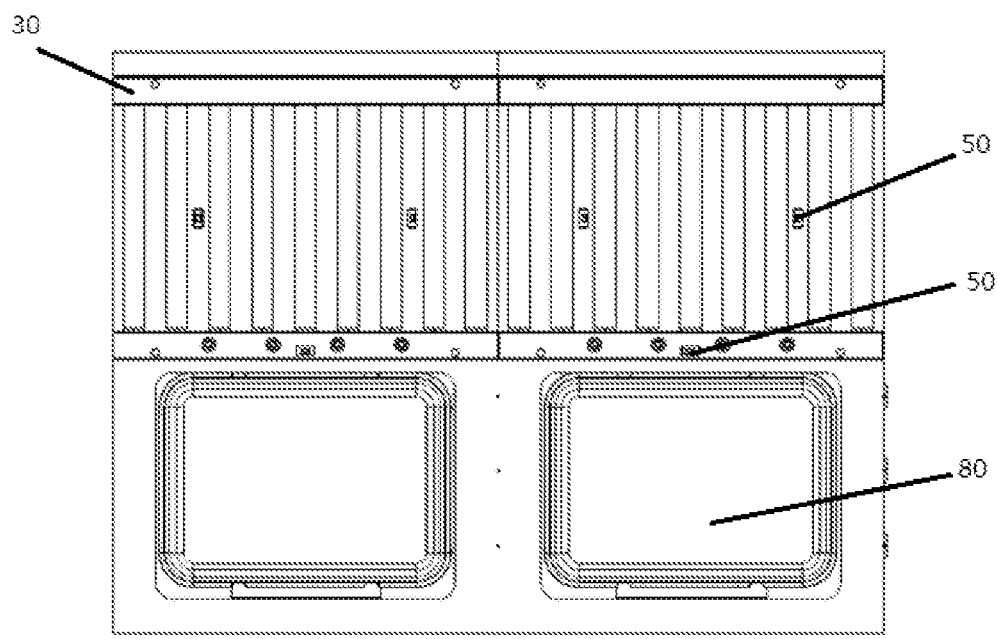
FIG. 6 is a partial top view of an automatically tray feeding device according to some exemplary embodiments of the present disclosure.

FIG. 6 is a partial top view of an automatically tray feeding device according to some exemplary embodiments of the present disclosure. As shown, a plurality of photoelectric detection devices 50 may be provided on the sorting table frame 30, so as to sense a position of a tray 80. For example, three photoelectric detection devices 50, such as three photoelectric switches may be mounted on the top of the sorting table frame 30, where two photoelectric switches may be located between the conveying rollers and a distance between the two photoelectric switches may be less than a length of the tray 80, and the remaining photoelectric switch may be arranged closer to the tray 80 than the two photoelectric switches. The three photoelectric switches are used to detect whether the tray 80 has left a sorting position. When the present tray 80 has left, the lifting mechanism 20 may continue to move, so that a next tray 80 is lifted by the lifting mechanism 20. For example, when the three photoelectric switches are all blocked by the tray 80, and the photoelectric switch closer to the tray 80 is first blocked and then exposed, it may be determined that the tray 80 has left the sorting table.

In addition, a photoelectric switch may also be provided in the sorting table frame 30. With the help of the photoelectric switch, when the tray 80 is detected to be lifted by the lifting mechanism 20 to a certain position, for example, at a height of 200 mm, a next tray 80 may be transported from the lower conveying mechanism 10 to a bottom pallet 23 of the lifting mechanism 20 for a future use.

Referring back to FIG. 1, in some embodiments, in addition to the conveying mechanisms 10 located at different heights, the automatically tray feeding device 1 may further include a conveying mechanism 10 and a tray translation mechanism 60 located at the same height. In a case of two conveying mechanisms 10 located at the same height, both the security inspector and the passenger may reach a tray, which may improve an efficiency of the automatically tray feeding device. The tray translation mechanism 60 may be mounted on the lower conveying mechanism 10, so as to transport a tray 80 at the bottom to the upper conveying mechanism, which may facilitate the use of passenger and avoid the passenger from bending over to take the tray.

Figure 7:
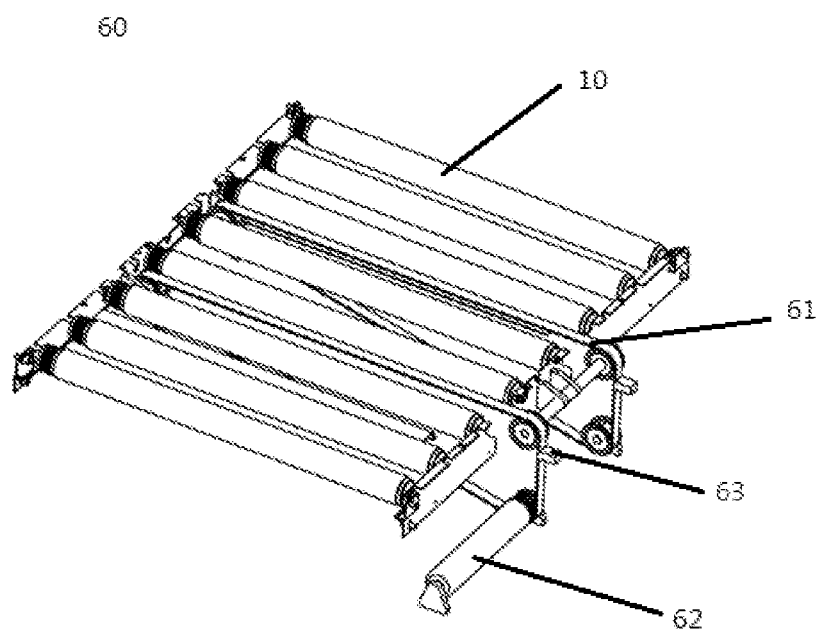
FIG. 7 is a schematic perspective view of a tray translation mechanism according to some exemplary embodiments of the present disclosure.

FIG. 7 is a schematic perspective view of a tray translation mechanism according to some exemplary embodiments of the present disclosure. As shown in FIG. 7, in this embodiment, the tray translation mechanism 60 may include at least two synchronous pulleys 61, a transmission roller 62 and at least two shifting members 63. In some other embodiments, the tray translation mechanism may include three or more synchronous pulleys, so that the tray may be moved more stably. The synchronous pulley 61 may be mounted on the conveying mechanism 10, specifically in a gap between the electric roller 11 and the driven roller 12. The synchronous pulley 61 may further include two synchronous belts and a plurality of roller wheels supporting the synchronous belt to move. The transmission roller 62 may be connected to the synchronous belt wheel 61 through the roller wheel, so as to drive the synchronous belt wheel 61 to move. The transmission roller 62 may be driven by a motor. One or more shifting members 63 may be arranged on a synchronous belt by bonding or other connection forms, and are used to push a tray 80 on the synchronous belt onto the pallet 23 of the lifting mechanism 20. Alternatively, the shifting member may be arranged on the synchronous belt or formed integrally with the synchronous belt. The synchronous belt is arranged in a longitudinal direction of the electric roller 11, so that when the tray 80 moves to the synchronous belt, the tray 80 originally moving on the electric roller 11 may change a movement direction through the synchronous belt. For example, a forward direction after the direction change may be perpendicular to a forward direction before the direction change, so that the tray 80 is moved from one conveying mechanism 10 to another conveying mechanism 10 at the same height. A shape, a height and the number of the shifting members 63 are not limited herein, as long as the tray 80 may be pushed. As shown, each synchronous belt is provided with one shifting member 63, and the shape of the shifting member 63 is similar to a block.

In an embodiment, a distance between the electric roller 11 and an adjacent driven roller 12 is 100 mm, or a distance between two adjacent electric rollers 11 is 100 mm, so that the tray translation mechanism 60 may be provided between the electric roller 11 and the adjacent driven roller 12, or between the two adjacent electric rollers 11. For example, the synchronous belt and the moving mechanism may be provided therebetween.

Figure 8:
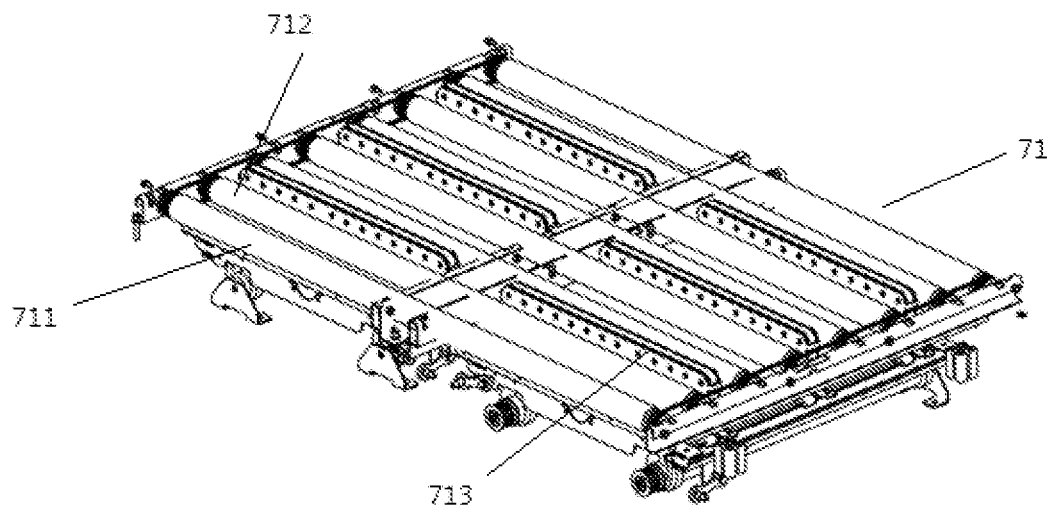
FIG. 8 is a schematic perspective view of another tray translation mechanism according to some exemplary embodiments of the present disclosure.
Figure 9:
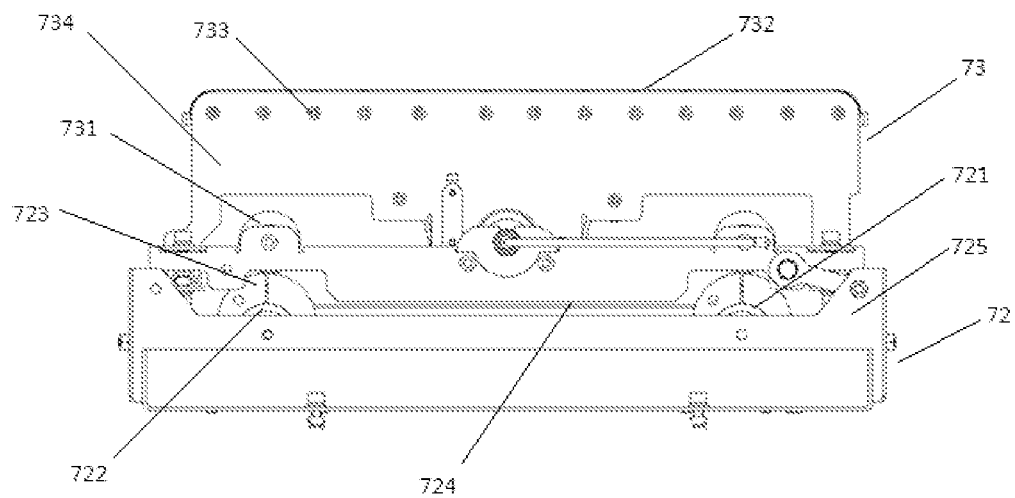
FIG. 9 is a side view of a tray translation mechanism according to some exemplary embodiments of the present disclosure.

FIG. 8 is a schematic perspective view of a tray translation mechanism according to some exemplary embodiments of the present disclosure. FIG. 9 is a side view of a tray translation mechanism according to some exemplary embodiments of the present disclosure. As shown in FIGS. 8 and 9, in this embodiment, a tray translation mechanism 70 includes a roller conveying mechanism 71, a raising mechanism 72 and a moving mechanism 73. The roller conveying mechanism 71 may include an electric roller 711, a driven roller 712 and a belt 713. The electric roller 711 may drive the belt 713 and the driven roller 712 to rotate, so that the tray is driven to move forward. The raising mechanism 72 may include an electric roller 721, a driven roller 722, a cam 723, a belt 724, and a frame 725. A rotation of the electric roller 721 may drive the cam 723 to rotate, so that the moving mechanism 73 arranged on the cam 723 may be raised by the cam 723. As a result, the tray may leave the roller conveying mechanism 71. The moving mechanism 73 may include an electric roller 731, a belt 732, a supporting wheel 733 supporting the belt 732, and a translation frame 734. The electric roller 731 may rotate to drive the belt 732 to move, so as to drive the translation frame 734 to move, and the translation frame 734 may drive the tray to move laterally. The moving mechanism 73 may be located between rollers of the roller conveying mechanism 71. As shown in FIG. 9, the translation frame 734 may be mounted on the frame 725 of the raising mechanism 72, and the supporting wheel 733 may be arranged on the translation frame 724.

Figure 10:
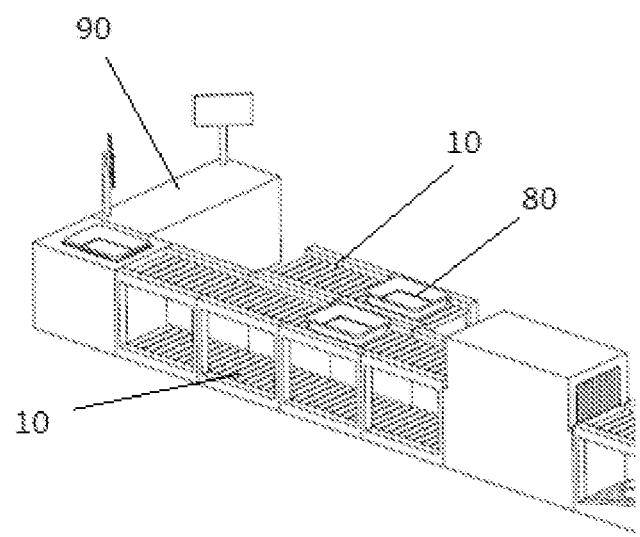
FIG. 10 is a partial schematic perspective view of a security inspection system including an automatically tray feeding device according to some exemplary embodiments of the present disclosure.

FIG. 10 is a partial schematic perspective view of a security inspection system including an automatically tray feeding device according to some exemplary embodiments of the present disclosure. As shown in FIG. 10, the automatically tray feeding device in the embodiments described above may be applied to a tray sorting table 90, and further to a luggage security inspection system. As such, an empty tray may be automatically supplied to the sorting table 90, so as to reduce the occurrence of passengers looking for trays and provide a more convenient service. In addition, it may avoid the passenger from bending over to take the tray, and provide a more user-friendly service to the passenger.

An operation of the automatically tray feeding device will be described below with reference to the drawings. As shown in FIGS. 1 to 9, when an empty tray is conveyed to the lifting mechanism by the lower conveying mechanism 10, the pallet 23 of the lifting mechanism 20 may hold up the tray 80. When the tray 80 is lifted to a preset position, for example, a position higher than the lowest position, the two flexible plates 43 on the top of the sorting table may move away from each other to form the top opening. When the tray 80 is lifted to the highest position, the two opposite flexible plates 43 are still maintained far away from each other, and the tray 80 is located on the pallet. Then the passenger may start to sort the luggage. When the passenger moves the tray 80 to the upper conveying mechanism, the pallet of the lifting mechanism 20 begins to fold. After the folding, the lifting mechanism 20 is lowered to a position defined by a lower limit member 24, and the folded pallet is unfolded, to repeatedly perform the steps of lifting the tray 80 above.

In another embodiment, when the tray is lifted to the highest position, the two opposite flexible plates 43 may move towards to each other, so as to close the opening. As such, the tray is located on the retractable pallet mechanism 40 and may be supported more stably.

Although FIGS. 1 to 10 illustrate and describe specific embodiments of the automatically tray feeding device, those skilled in the art may understand that the situation discussed herein may be replaced by other components that may achieve this function. The terms used here are only for an exemplary purpose of the present disclosure and should not be construed as limiting the meaning or the scope of the present disclosure. Unless a specific example is clearly indicated in the context, a singular form used in the specification may include a plural form. Moreover, the expression "including" used in the specification neither limits the mentioned shape, number, step, action, operation, member, element and/or a group thereof, nor exclude an appearance or an addition of one or more other different shapes, numbers, steps, operations, members, elements and/or a group thereof. For ease of description, space-related terms such as "on", "above", "upper", "under", "below", "lower", etc. are used here to describe a relationship between an element or feature and another element or feature as shown. It should be understood that, in addition to the orientations illustrated in the drawings, the space-related terms are intended to include different orientations of devices (such as packaging) in use or operation. For example, if the device shown is turned over, an element described as under or below another element or feature may be oriented on or above the other element or feature. Thus, the exemplary term "on" may include orientations of "above" and "below".

The terms such as "first", "second", etc. are used here to describe various members, components, regions, layers and/or parts. However, it is obvious that the members, components, regions, layers and/or parts should not be limited by these terms. These terms are only used to distinguish one member, component, region, layer or part from another member, component, region, layer or part. Therefore, the description of the first member, component, region, layer or part may also refer to the second member, component, region, layer or part without departing from the scope of the present disclosure.

The above description of the exemplary embodiments of the present disclosure is presented only for the purpose of illustration and description, and is not intended to be exhaustive or to limit the present disclosure to a precise form disclosed. Based on the above teaching, a plurality of modifications and changes are possible. The embodiments are selected and described in order to explain the principle of the present disclosure and its practical application, so that other skilled in the art may use the present disclosure and various embodiments. The embodiments of the present disclosure may have various modifications suitable for a specific purpose conceived. Without departing from the spirit and scope of the present disclosure, alternative embodiments may be apparent to those skilled in the art. Therefore, the scope of the present disclosure is defined by the appended claims rather than by the foregoing description and the exemplary embodiments described therein.

What is claimed is:

1. An automatically tray feeding device, comprising:
    at least one conveying mechanism configured to convey a tray at different heights;
    at least one lifting mechanism configured to move the tray on a conveying mechanism at a first height to a conveying mechanism at a second height different from the first height;
    a sorting table frame configured to carry the at least one conveying mechanism and the at least one lifting mechanism; and
    at least one retractable pallet mechanism mounted on the sorting table frame and comprising a pair of rails;
    wherein the pair of rails face each other and are formed in a shape substantially of "| |", and the at least one flexible plate is bendable by 90 degrees.

2. The automatically tray feeding device according to claim 1, wherein the at least one retractable pallet mechanism is mounted on a top of the sorting table frame, wherein the at least one lifting mechanism is configured to lift the tray on the conveying mechanism located at the first height or the tray on the conveying mechanism located at the second height to the top of the sorting table frame when the retractable pallet mechanism is retracted.

3. The automatically tray feeding device according to claim 1, wherein the lifting mechanism comprises
    a drive motor;
    a straight rail;
    a synchronous belt;
    a pallet; and
    at least one limit member, wherein the pallet is configured to be moved up and down through the straight rail and the synchronous belt, and a range of a movement of the pallet is restricted by the at least one limit member.

4. The automatically tray feeding device according to claim 3, wherein the pallet is foldable or is rotatable by 90 degrees about a side of the pallet.

5. The automatically tray feeding device according to claim 2, wherein the retractable pallet mechanism further comprises:
    at least one pulley slidable in the pair of rails; and,
    at least one flexible plate, wherein the at least one pulley is mounted on the at least one flexible plate.

6. The automatically tray feeding device according to claim 1, wherein the at least one conveying mechanism comprises:
    at least one electric roller;
    a plurality of driven rollers; and
    at least one transmission belt, wherein the at least one electric roller is configured to drive the plurality of driven rollers to move through the at least one transmission belt.

7. The automatically tray feeding device according to claim 1, further comprising at least one photoelectric detection device mounted on the sorting table frame to sense a position of the tray.

8. The automatically tray feeding device according to claim 6, further comprising a conveying mechanism and a tray translation mechanism located at the same height, wherein the tray translation mechanism is mounted on the conveying mechanism located at the same height.

9. The automatically tray feeding device according to claim 8, wherein the tray translation mechanism comprises:
    a synchronous pulley;
    a transmission roller; and,
    a shifting member, wherein the transmission roller is configured to drive the synchronous pulley to rotate, and the shifting member is located on the synchronous belt to push the tray to move.

10. The automatically tray feeding device according to claim 9, wherein the synchronous pulley is located between the electric roller and a driven roller adjacent thereto.

11. The automatically tray feeding device according to claim 8, wherein the tray translation mechanism comprises:
    a roller conveying mechanism;
    a raising mechanism; and,
    a moving mechanism, wherein the raising mechanism comprises a cam configured to raise the moving mechanism, so that the tray leaves the roller conveying mechanism and is moved laterally by the moving mechanism.

12. The automatically tray feeding device according to claim 11, wherein the moving mechanism is located between the electric roller and a driven roller adjacent thereto.

13. A tray sorting table, comprising the automatically tray feeding device according to claim 1.

14. A baggage security inspection system, comprising the automatically tray feeding device according to claim 1.

* * * * *